United States Patent
Serbin et al.

[11] Patent Number: 5,904,889
[45] Date of Patent: May 18, 1999

[54] APPARATUS AND METHOD FOR PRODUCING AN OBJECT USING STEREOLITHOGRAPHY

[75] Inventors: Jürgen Serbin, Gräfelfing; Peter Wolff, Brunnthal; Gabriele Krug, München, all of Germany

[73] Assignee: 3D Systems, Inc., Valencia, Calif.

[21] Appl. No.: 08/765,688
[22] PCT Filed: Apr. 24, 1996
[86] PCT No.: PCT/EP96/01703
§ 371 Date: Dec. 23, 1996
§ 102(e) Date: Dec. 23, 1996
[87] PCT Pub. No.: WO96/33859
PCT Pub. Date: Oct. 31, 1996

[30] Foreign Application Priority Data

Apr. 25, 1995 [DE] Germany ............................ 195 15 165

[51] Int. Cl.⁶ ............................ B29C 35/08; B29C 41/02; B29C 41/52
[52] U.S. Cl. ........................... 264/401; 118/100; 118/120; 264/40.1; 264/40.7; 264/308; 264/497; 425/135; 425/145; 425/174.4; 427/356; 427/358
[58] Field of Search ................................. 264/40.1, 40.7, 264/308, 401, 497; 425/135, 145, 174.4; 427/356, 358; 118/100, 120

[56] References Cited

U.S. PATENT DOCUMENTS

| | | | |
|---|---|---|---|
| 5,044,306 | 9/1991 | Erdmann | 118/120 |
| 5,174,931 | 12/1992 | Almquist et al. | 264/401 |
| 5,330,574 | 7/1994 | Nakagawa et al. | 118/120 |
| 5,358,673 | 10/1994 | Heller et al. | 264/401 |
| 5,573,721 | 11/1996 | Gillette | 264/401 |

FOREIGN PATENT DOCUMENTS

| | | |
|---|---|---|
| 171 069 | 2/1986 | European Pat. Off. . |
| 250 121 | 12/1987 | European Pat. Off. . |
| 361 847 | 4/1990 | European Pat. Off. . |
| 450 762 | 10/1991 | European Pat. Off. . |
| 499 485 | 8/1992 | European Pat. Off. . |
| 2 583 334 | 12/1986 | France . |
| 4134265 | 4/1993 | Germany . |
| 9400372 | 5/1994 | Germany . |
| 9415849 | 1/1995 | Germany . |
| 4417083 | 11/1995 | Germany . |
| 2 262 817 | 6/1993 | United Kingdom . |
| WO 91/12120 | 8/1991 | WIPO . |
| WO 96/12608 | 5/1996 | WIPO . |

*Primary Examiner*—Leo B. Tentoni
*Attorney, Agent, or Firm*—Dennis Smalley

[57] ABSTRACT

An apparatus for producing an object by stereolithography is provided with a tank (1) receiving a bath of liquid or powdery material which can be solidified by action of electromagnetic radiation. In known manner the apparatus comprises a support (4) for positioning the object relative to the surface (3) of the bath and a device (8) for solidifying a layer of the material (3) adjacent to the surface using electromagnetic radiation. In order to allow a precise adjustment of the layer thickness the apparatus comprises a supplying device (51) for supplying the solidifiable material (3), the supplying device extending transversely across the tank and having a discharge opening (53) at its bottom side in operational position, a channel extending in the interior thereof and communicating with the discharge opening (53), the channel being connected at one point with a pump (63) through a conduit (62).

26 Claims, 6 Drawing Sheets

APPARATUS AND METHOD FOR PRODUCING AN OBJECT USING STEREOLITHOGRAPHY

BACKGROUND OF THE INVENTION

1. Field of the Invention.

The invention relates to an apparatus and a method for producing an object using stereolithography.

2. Description of Related Art

A stereolithography apparatus of this kind is disclosed in German Patent 41 34 265. The wiper disclosed therein may have an anti adhesive coating or may be formed of a material having low adhesion properties. If such a wiper has low adhesive forces, there is a risk that the contact between the wiper and the liquid resin material is locally broken during the wiping operation. This may cause the so-called dewetting. However, if the wiper is formed of a material having a great surface tension, irregular coatings are experienced, because the resin material rises again at the trailing side of the wiper.

Various coating methods are known for the stereolithography. According to the EP 0 171 069 a liquid layer of the light-curable resin is applied by lowering the object by an amount exceeding the desired layer thickness in a bath and subsequent rising the object to an elevation corresponding to the predetermined layer thickness below the surface of the bath. In EP 0 250 121 it is disclosed to apply the material for one layer from above using an inlet, whereas in WO91/12120 a spray tube is used. With the mentioned applying methods the adjustment speed of a desired layer thickness is not optimized.

In order to attain the layer thickness in a fast manner applying methods using a wiper are known. In the simplest case described in DE-C-41 34 265 the support carrying the object to be formed is lowered in a bath of liquid, light-curable resin material by an amount corresponding to the desired layer thickness, whereby uncured material flows over the previously cured layer from the edge thereof. In order to increase the speed of attaining the desired layer thickness with the wiper the material is spread over the previously cured layer. The applying operation may also be expedited by lowering the support in the bath by an extent greater than the predetermined layer thickness and subsequent spreading using the wiper. However, these methods are disadvantageous in that the produced layer thickness is considerably greater than the desired layer thickness. A solution for this problem known to the applicant consists in collecting the amount of resin which is displaced by lowering the support in the bath and continuously reapplying the same to a place directly preceding the wiper during the wiping operation by using a continuously operating low-pressure pump, thereby obtaining a quasi-continuous application. A further known variant of an applying method is the so-called coater-channel-method wherein the amount of resin displaced by the lowering operation is pumped all at once in a discrete pumping operation into a coating channel located in front of the wiper with respect to the wiping or travelling direction thereof and delivered therefrom to a location directly upstream of the wiper through an outlet provided at the coating channel. The delivery of the resin amount from the coating channel varies exponentially over the surface to be coated as a function of the instantaneous filling level in the coating channel, i.e. the less resin is present in the coating channel, the less is delivered. This produces a layer thickness which decreases with the coating distance.

Figure 8:
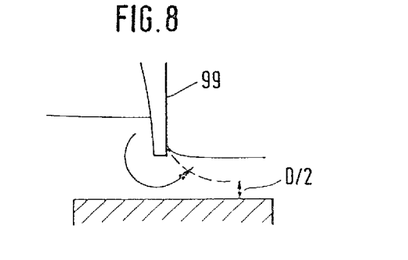
FIG. 8 is a schematic representation of a problem occurring when using a conventional wiper.

A general problem encountered when using the known wiper is the interaction of the wiper with the resin or the plastic material used which causes the above-mentioned "dewetting". Further, as shown in the FIGS. 8 and 9, the flow around the wiper 99 within "closed volumes" 100, i.e. regions of liquid resin encircled by solidified resin 101, produces a superelevation of the bath surface which causes variations in dimension of the object, in particular of the object within the "closed volume" (CV+, CV− effects). A further disadvantageous effect of the known coating method using a wiper is the nose 102 produced during the coating operation at the interface between the previously solidified layer and uncured resin, as shown in FIG. 10. Further, concave or convex surfaces may be produced by the flow around the wiper and cause dimensional inexactness of the object.

SUMMARY OF THE INVENTION

It is the object of the invention to provide an apparatus and a method for producing a three-dimensional object using stereolithography which improves the precision of the object. In particular, the adjustment of the layer thickness shall be facilitated.

A first aspect of the invention provides an apparatus for producing an object by stereolithography, including: (1) a tank for receiving a bath of liquid or powdery material which can be solidified by action of electromagnetic radiation; (2) a support for positioning the object relative to the surface of the bath; (3) a device for solidifying a layer of the material at the surface by means of electromagnetic radiation, and (4) a supplying device for supplying the solidifiable material. The supplying device includes a discharge opening at its lower side in an operational position and a channel extending in the interior thereof and communicating with the discharge opening, wherein the channel is connected with a pump through a conduit.

A second aspect of the invention provides a method for producing a three-dimensional object by stereolithography, whereby the object is layerwise produced by applying a respective layer of a viscous material which can be solidified by electromagnetic radiation, and thereafter solidifying the layer at places corresponding to the object by irradiation, wherein the layer of material is applied to a support or previously solidified layer by means of and while moving a supplying device across the surface of the support or the surface of the previously solidified layer.

Further features and advantages of the invention will be apparent from the description of embodiments with reference to the Figures. In the Figures:

DETAILED DESCRIPTION OF PREFERRED EMBODIMENTS

The inventive apparatus will now be explained with reference to the FIGS. 1 to 7.

Figure 1:
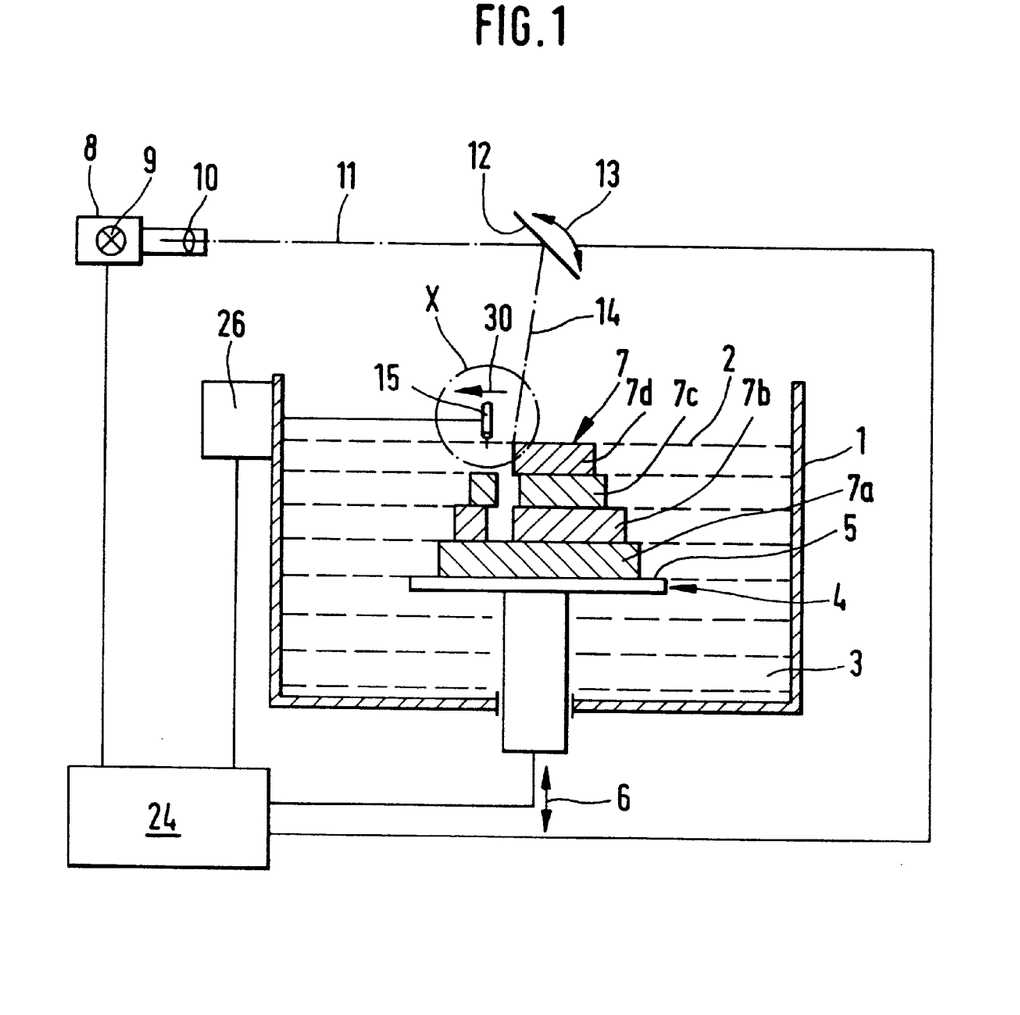
FIG. 1 is a schematic representation of the apparatus according to a first embodiment of the invention.

A tank 1 having an open top is filled with a light-curable liquid resin material 3, for example a UV-curable resin, up to a level or surface 2. A support 4 having a substantially plane and horizontal support plate 5 is disposed in the tank 1 within the volume of the resin 3. The support plate 5 extends parallel to the surface 2 and can be displaced and positioned upwards and downwards in a direction perpendicular to the surface 2 or to the support plate 5, by means of a schematically indicated displacement or elevational adjustment device 6.

On the support plate 5 there is the object 7 which is constructed in a manner described further below from a plurality of layers 7a, 7b, 7c and 7d each extending parallel to the surface 2 and to the support plate 5.

A device 8 for solidifying the uppermost layer 7d adjacent to the surface comprises an illumination device 9 having a light source which produces a focussed light beam 11 by means of an optical system 10. A deflection mirror 12 is suspended on gimbals about centrally above the tank 1 and can be pivoted by a schematically indicated pivoting device 13 so that the light beam 11 directed onto the mirror 12 is reflected as a reflected light beam 14 which can be positioned onto substantially any place of the surface 2. Alternatively two rotating mirrors, a respective one for each coordinate direction, may be used in known manner.

A wiper 15 which is schematically indicated in FIG. 1 is arranged at the open top of the tank 1. The wiper extends substantially transversely across the open top of the tank 1 and is coupled with a translating device 26 for translating the wiper 15 in a horizontal plane across the surface 2 in a direction 30 which is substantially perpendicular to the extension of the wiper 15.

The translating device 26 is designed to displace the wiper 15 with an adjustable variable speed.

A processor 24 is coupled with the illumination device 9, the pivoting device 13, the elevational adjustment device 6 and the translating device 26 for carrying out the per se known stereolithographic operation.

Figure 2:
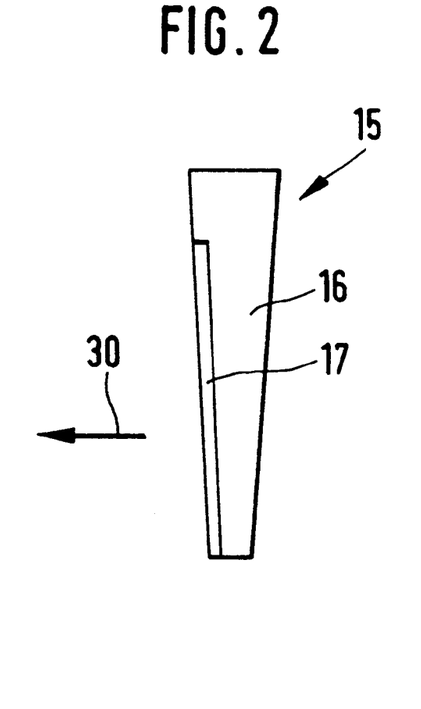
FIG. 2 shows a first embodiment of the wiper.
Figure 3:
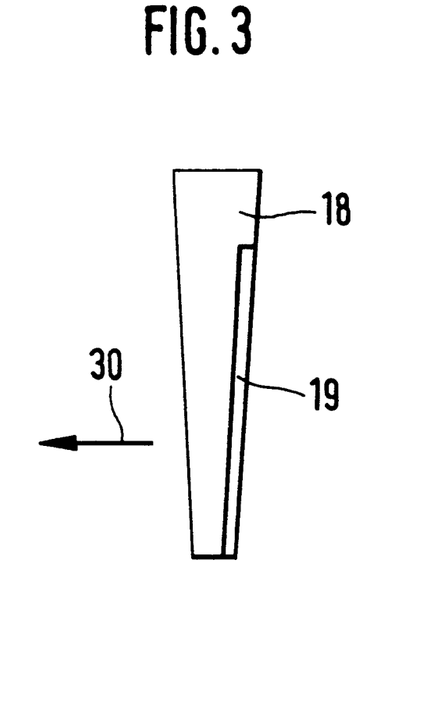
FIG. 3 shows a second embodiment of the wiper.
Figure 4:
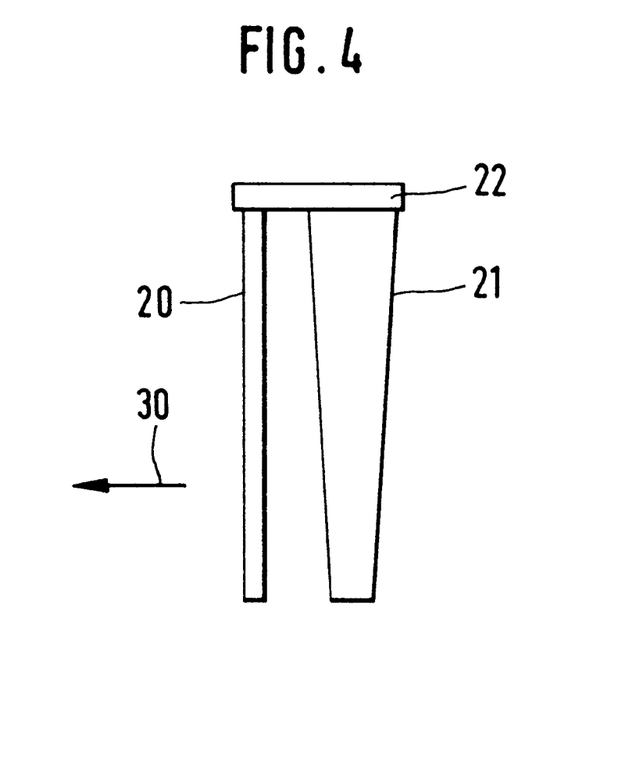
FIG. 4 shows a further modified embodiment of the wiper.

The FIGS. 2 to 4 show embodiments of wipers whereby the advance direction during the wiping operation proper is indicated by the arrow 30 in each case.

The outer shape and the dimensions of the wiper 15 are defined in a manner known per se. In the first embodiment shown in FIG. 2 the wiper 15 has a body 16 made of a first material. A material layer forming a first surface portion 17 is applied to the leading front surface in the travelling direction indicated by the arrow 30 for contacting the material 3 for smoothing. The application may for example be made by bonding to the body. In this embodiment the body has a corresponding recess to which the coating material forming the first surface portion is applied by bonding. In the first embodiment the body 16 is made of a material such as VITON or PTFE or a material having a comparably low surface tension value. A coating of aluminum or steel or a material having a correspondingly similar high surface tension value is provided on the front side.

The modified embodiment shown in FIG. 3 differs from the preceding one in that a body 18 is made of a material such as aluminum or steel or a material having a correspondingly high surface tension value. The back side is coated at a surface portion 19 with a material such as viton or PTFE or a material having a comparably low surface tension value. This coating may be made by bonding to the surface. In the shown embodiments the back side of the body 18 has a recess to which a layer of VITON or PTFE for forming the second surface portion 19 is applied.

In the embodiment shown in FIG. 4 the wiper is formed of a preliminary wiper 20 and the wiper member proper 21, as seen in the advance direction indicated by the arrow 30. Both wipers are connected at their upper side through a common yoke 22 for mounting the thus formed wiper in a holder of the device which is connected to the drive 16. The preliminary wiper 20 leading in advance direction is formed of aluminum or steel or of a material having a correspondingly high surface tension value. The following wiper member 21 is formed of a material such as VITON or PTFE or of a material having a correspondingly low surface tension value.

In operation the breaking of the resin film at the front side is prevented by the relatively high surface tension.

At the same time the accumulation of excess material on the back side of the wiper is prevented by the low surface tension value.

Figure 5:
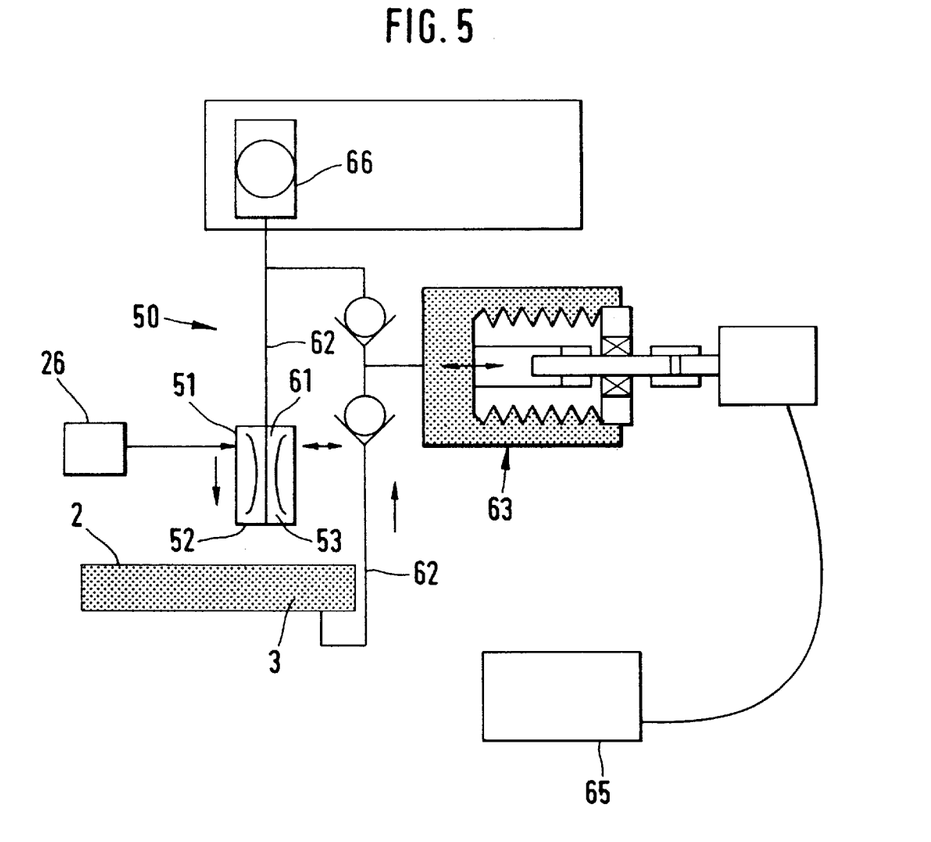
FIG. 5 is a partial schematic view of a second embodiment of the apparatus.
Figure 6:
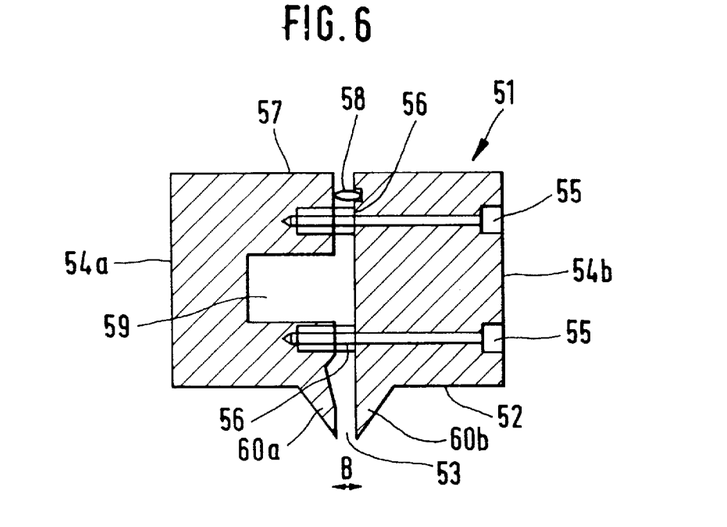
FIG. 6 is a sectional view of the metering device of FIG. 5.
Figure 7A:
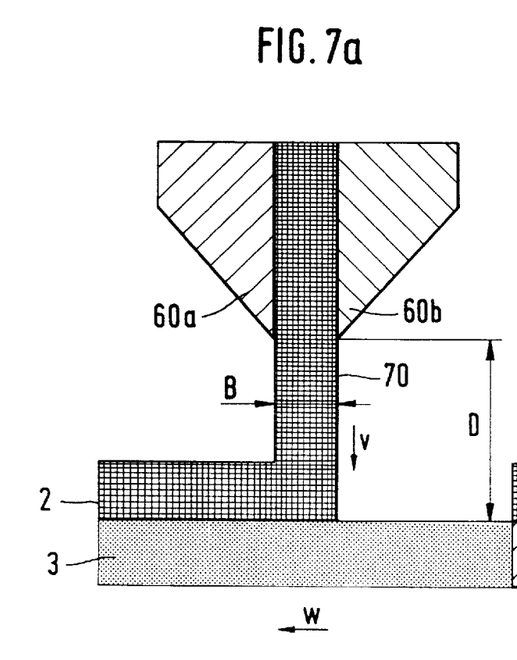
FIG. 7a–7b is a schematic sectional view of the coating operation according to one embodiment.
Figure 7B:
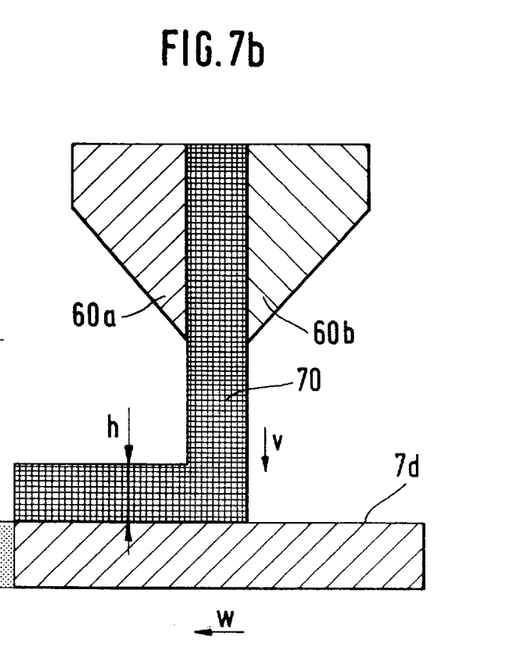

A further embodiment of the inventive apparatus as shown in the FIGS. 5 to 7 has, in addition to the wiper 15 shown in the FIGS. 1 to 4 or in place thereof, a coating device 50 which allows the applied amount or the resin volume, to be metered in such a precise manner that the desired layer thickness is obtained without having to use a wiper for adjusting the layer thickness.

The coating device 50 comprises a metering device 51 which is disposed above the bath surface 2 and extends across the working area or bath surface 2,. A gap 53 extends through the entire bottom side 52 of the metering device facing the bath surface 2. As shown in FIG. 6 the metering device 51 comprises two parts or jaws 54a and 54b having a substantially rectangular cross-section in a plane perpendicular to the bath surface 2. The jaws 54a and 54b are screwed together by bolts 52 and spacers 56 in such a manner that their facing planes define the gap 53 of the metering device 51 therebetween. At the side 57 of the gap 53 opposite to the bath surface 2 and to the bottom side 52 of the metering device, the gap 53 is sealed by a flexible gasket 58 consisting for example of rubber or silicon between the parts 54a and 54b. One of the jaws 54a has a channel-shaped recess 59 which is provided in the side thereof facing the other jaw 54b and extends across the entire width of the bath surface 2. The purpose of the recess 59 is to receive a defined amount of resin from an inlet which is not shown in FIG. 6 so that a small resin reservoir can always be maintained within the channel-shaped recess 59. The channel-shaped recess 59 is closed at the end thereof which is not connected to the inlet so that the resin is forced to emerge through the gap 53. At their lower side 52 facing the bath surface 2 the jaws 54a and 54b each have a projection 60a and 60b, respectively, at their facing sides. The projections have a substantially triangular cross-section and extend across the entire width of the bath surface 2. The projections 60a, 60b form, together with the gap 53 therebetween, a type of nozzle for discharging the resin. The gap width B, i.e. the distance between both jaws 54a and 54b, can be adjusted by suitable selection of the spacers 56.

Usually the gap width B is about one layer thickness, i.e. several tenths of a millimeter. The elevation of the metering device 51 above the bath surface 2 can be adjusted by a not shown elevational adjustment device. In the described embodiment the elevation is adjusted so that the discharge opening of the nozzle 60a, 60b is immediately above the bath surface 2 without touching the same.

In this embodiment there is an additional, not shown wiper mounted to the metering device 51 at the side thereof which is behind the gap 53 in moving direction of the metering device for coating. The wiper serves for smoothing the material emerging from the gap 53.

The metering device is connected with the above-mentioned translating device 26 which is controlled to allow the metering device 51 to be displaced with an adjustable variable travelling speed w parallel to the bath surface 2.

As in particular shown in FIG. 5 an inlet 61 of the gap 53 of the metering device 51 communicates with the resin bath 3 within the tank 1 through a conduit 62, whereby a leakage-free operating and continuously feeding pump 63 is arranged between the bath and the metering device 51. The pump 63 feeds the resin 3 from the tank 1 through the conduit 62 into the metering device 51 with a preadjusted pressure. Preferably the pump 63 is formed as a bellows pump having a large stroke volume. The size of the stroke volume of the pump 63 is so that a single stroke only is required for one coating operation. The discharge pressure of the pump 63 is about 1 bar in this embodiment. The pump 63 is controlled by a control device 65 so that it discharges the resin 3 with a constant, preadjusted volume rate which is independent of the counterpressure varying e.g. due to varying viscosity of the resin.

Moreover, the control device 65 is designed to control the discharge volume rate of the discharged resin 3 across the entire travelling range of the metering device 51 whereby the amount of resin discharged through the gap 53 can be metered. The control device 65 of the pump is connected with the central control 24 so that the drive of the pump 63 can be controlled by a processor provided within the central control. Thus, the resin volume rate discharged through the gap 53 can be controlled as a function of the respective desired layer thickness.

In a preferred embodiment which is shown in FIG. 7 the projections 60a, 60b of the metering device 51 are spaced from the bath surface 2 by a distance D of for example 3 to 5 millimeter, rather than immediately adjacent thereabove. In this case the pump 63 is continuously operated with a small stroke volume, i.e. several strokes are required for coating one layer. In this case the pump 63 has a high discharge pressure of up to 5 bar. For ensuring a continuous discharge pressure the pump 63 communicates with an accumulator 66 adding a gas volume to the conduit 62 for maintaining the high delivery pressure constant.

Under such high-pressure working conditions it is an advantage not having to use movable resin-conducting conduits in order to safely prevent an uncontrolled leakage of resin. In this case the pump 63 travels together with the metering device.

It is further possible to provide a measuring device for measuring the surface level of the coated layer or of the surface of a reference component. The reference component may for example be a cube which is simultaneously constructed at the border line of the working region. The measuring device determines the thickness of the layers to be applied.

In the inventive method the following steps are carried out for each solidified layer of the object using the coating device 50 shown in FIG. 5.

Before starting the construction process the gap width B is adjusted to the size of the desired layer thickness by selecting suitable spacers. This adjustment is made also as a function of the viscosity of the resin used.

In a first step the support 4 within the tank 1 is lowered by an amount corresponding to the desired layer thickness using the elevational adjustment device 6.

Thereupon the pump 63 supplies a defined amount of resin 3 from the tank 1 whereby the stroke volume of the feed pump is adjusted so that the supplied amount is sufficient for applying one new layer. Thereafter the translating device 26 is controlled so that the metering device is moved across the bath surface 2, whereby the resin flowing through the conduit 62 into the gap 53 is applied onto the surface of the previously solidified layer through the gap or nozzle 60a, 60b of the metering device 51. The wiper 15 mounted behind the metering device 51 in moving direction thereof smoothes the applied layer of the resin 3. A uniform distribution of the applied material in travelling direction of the metering device is obtained by tuning the feed volume rate and the travelling speed w of the metering device. Component defects can be prevented by varying the coating volume during the movement of the metering device.

For example, components can be positioned within the construction area so that they are coated with different amounts of resin.

Figure 9A:
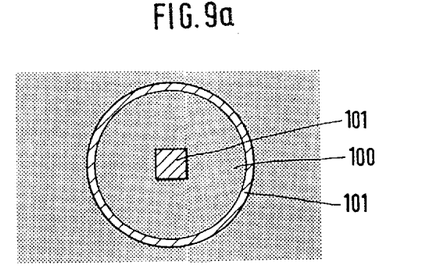
FIG. 9a–9c are schematic views of problems encountered when using conventional wipers in the presence of "closed volumes"
Figure 9B:
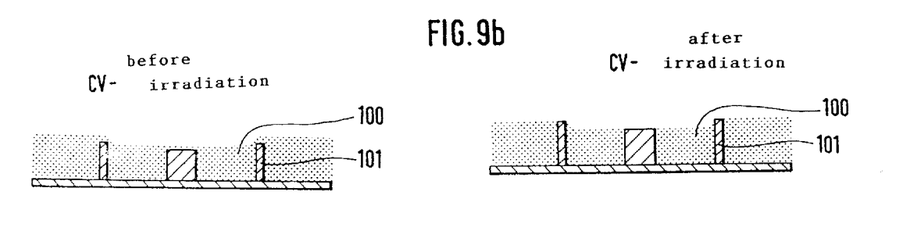
Figure 9C:
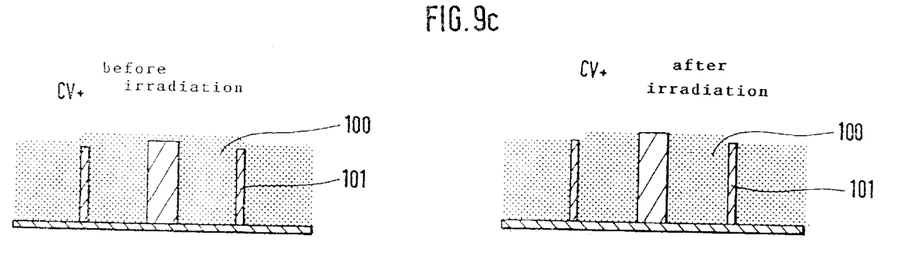
Figure 10:
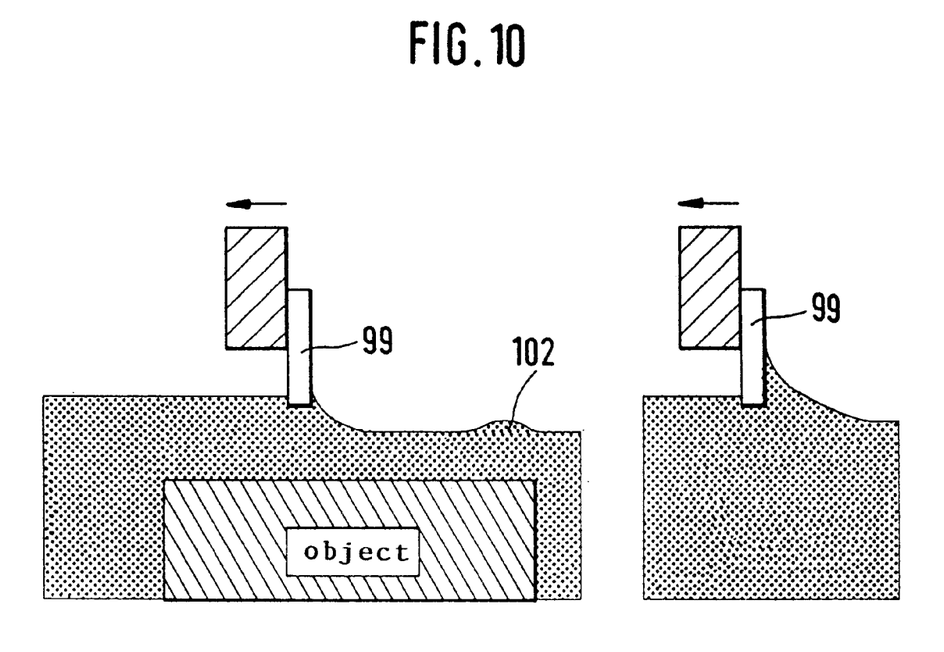
FIG. 10 is a schematic representation of a further problem occurring when using a conventional wiper.

The CV+ effect shown in FIG. 9c can be advantageously prevented by adjusting the stroke volume of the pump 63 to correspond to 1.8 times the layer volume.

The applied layer is then solidified a the places corresponding to the object by using the laser beam 14. To this end the pivoting device 13 is controlled so that the deflected light beam 14 strikes the desired places of the layer and cures the resin 3 thereat.

The described steps are repeated until the object 7 is finished.

According to a further embodiment of the method, as shown in FIGS. 7a and 7b, the elevation of the metering device 51 is adjusted before starting the construction process so that the nozzle 60a, 60b is positioned with a distance D of for example 3–5 mm above the bath surface 2.

As in the previously described embodiment a first step is to lower the support 4 within the tank 1 by an amount corresponding to the desired layer thickness. The pump 63 is operated with a high delivery pressure of up to 5 bar. To this end the control 65 adjusts the stroke volume to be smaller than the corresponding layer volume so that the pump 63 makes several strokes during one coating operation and therefore pumps continuously. The accumulator 66 ensures a constant pressure of the resin 3 in the inlet 61 to the gap 53. As a consequence of the high delivery pressure the speed v of the resin 3 within the gap 53 is so high that a film 70 is produced which, as shown in FIGS. 7a and 7b, exits at the lower side of the nozzle 60a, 60b and is put onto the previously solidified layer or unsolidified regions of the previous layer. The travelling speed w of the metering device 51 and the feed pressure of the pump 63 are adjusted so that the resin exiting from the nozzle 60a, 60b forms a film 70 which has a width corresponding to the desired layer thickness h and which is put onto the solidified regions of the previous layer (FIG. 7b) or onto unsolidified regions of the previous layer (FIG. 7a). In this case there is no interaction between the resin 3 at the bath surface 2 and the material discharged from the nozzle 60a, 60b so that in particular the disadvantageous effects such as the CV− or CV+ effects shown in FIGS. 9b and 9c or the nose shown in FIG. 10 are avoided.

Thereafter the layer is solidified at the places corresponding to the object in the same manner as in the previous embodiment.

The described coating method and the corresponding devices are advantageous in that the above-mentioned negative effects are prevented and the layer thickness can be easily adjusted and varied. The layer thickness can be easily adjusted by varying the gap width, the travelling speed of the metering device and the set feed volume of the pump. A high feed pressure and a corresponding high pressure drop in the narrow gap eliminate the influence of gravity onto the rate discharged through the gap and therefore increase the precision of the layer thickness. Furthermore, by varying the discharge volume of the pump from layer to layer or during the application of one layer the layer thickness can be easily adapted to the desired object properties.

We claim:

1. A stereolithographic apparatus for producing a three-dimensional object, said apparatus comprising:

a tank for receiving a bath of a liquid or powdery material suitable for solidification using electromagnetic radiation, said bath having a bath surface;

a relatively moveable support for positioning said object in said bath relative to said bath surface so as to form a layer of said material adjacent to said bath surface;

a solidification device for solidifying said layer by directing electromagnetic radiation thereto;

a coating device for supplying said material to said bath, said coating device having a bottom side arranged above said bath surface in an operational position;

an adjustable discharge opening including a gap which is provided in and extends along said bottom side, said gap having a gap width, and including a spacing device for adjusting said gap width;

a channel formed within said coating device and communicating with said discharge opening; and a pump communicating with said channel through a conduit for supplying said material to said adjustable discharge opening.

2. The apparatus of claim 1, further comprising a displacing mechanism for displacing said coating device in direction within a plane which is parallel to a plane of said bath surface, said displacing mechanism comprising a device for adjusting a displacing speed of said coating device.

3. The apparatus of claim 1, further comprising an elevational adjustment device for adjusting an elevation of said coating device above said bath surface.

4. The apparatus of claim 1, additionally comprising a conduit which communicates with said bath within said tank.

5. The apparatus of claim 1, further comprising control device connected to said pump for controlling a volume rate of the material discharged by said pump to be substantially constant.

6. The apparatus of claim 1, wherein said pump comprises a bellows pump having a stroke volume, said stroke volume being at least equal to a volume of said material which is required for applying a layer of said material, whereby said layer is applied in a single pump stroke.

7. The apparatus of claim 1, wherein said pump is a bellows pump having a stroke volume which is smaller than a volume of said material which is required for applying one layer of said material.

8. The apparatus of claim 7, further comprising an accumulator connected to said pump for maintaining constant a high feed pressure of said pump.

9. The apparatus of claim 1, further comprising means for mounting said pump to said coating device and means for moving said pump together with said coating device above said bath surface.

10. The apparatus of claim 1, further comprising a measuring device for detecting the level of the surface of an applied layer or of a surface of a reference component which is constructed together with said object within said bath of said material.

11. The apparatus of claim 1, wherein said coating device comprises a wiper.

12. A stereolithographic method for producing a three-dimensional object by solidiying successive layers of a material, said material being suitable for solidification when irradiated with electromagnetic radiation, comprising:

a) providing a bath of said material, said bath having a bath surface:

b) applying a layer of said material having a defined layer thickness including moving a supplying device above a support for the object or a previously solidified layer, said supplying device having a discharge gap provided at its bottom side facing said bath surface in an operational position, said discharge gap having a gap width;

c) solidifying said layer at places corresponding to said object including irradiating said layer with electromagnetic radiation;

d) repeating steps (b) and (c) a plurality of times to form the object from a plurality of solidified layers; and e) controlling the thickness of at least one of said applied layers including controlling the gap width.

13. The method of claim 12, further comprising forming said bath in a tank and supplying said material from said tank to said supplying device using a pump.

14. The method of claim 12, further comprising moving said supplying device in a plane spaced from said bath surface to form a gap between said bath surface and said discharge gap which is greater than said layer thickness.

15. The method of claim 12, further comprising controlling a volume rate of the material delivered through the discharge gap over an entire moving range of said supplying device.

16. The method of claim 13, further comprising controlling said pump to withdraw an amount of material required for applying one layer, from said bath, in a single pumping step.

17. The method of claim 13, further comprising controlling said pump to withdraw an amount of said material required for applying one layer, from said bath, in a plurality of pumping steps.

18. The method of claim 12, further comprising smoothing said layer before applying said electromagnetic radiation thereto.

19. The method of claim 12, wherein the step of adjusting said layer thickness comprises controlling a moving speed of said supplying device.

20. The method of claim 12, wherein the step of adjusting said layer thickness comprises controlling a delivery pressure of said pump.

21. A stereolithographic method for producing a three-dimensional object by solidifying successive layers of a material, said material being suitable for solidification when irradiated with electromagnetic radiation, comprising:

a) providing a bath of said material, said bath having a bath surface;

b) applying a layer of said material, said layer having a defined layer thickness, including moving a supplying device above a support for the object or a previously solidified layer, said supplying device having a discharge gap provided at its bottom side facing said bath surface in an operational position, said discharge gap having an adjustable gap width; and c) solidifying said layer at places corresponding to said object including irradiating said layer with electromagnetic radiation;

d) repeating steps b) and c) a plurality of times to form the three-dimensional object; and wherein the method further comprises setting the defined layer thickness including adjusting the gap width.

22. The method of claim 21, further comprising moving said supplying device in a plane spaced from said bath surface to form a gap between said bath surface and said discharge gap which is greater than said layer thickness.

23. The method of claim 21, further comprising controlling the volume rate of the material delivered through the discharge gap over the entire moving range of said supplying device.

24. The method of claim 21, further comprising supplying said material from said bath to said supplying device using a pump and controlling the pump to withdraw an amount of material required for applying one layer, from said bath, in a single pumping step.

25. The method of claim 21, further comprising supplying said material from said bath to said supplying device using a pump and controlling the pump to withdraw an amount of said material required for applying one layer, from said bath, in a plurality of pumping steps.

26. The method of claim 21, further comprising smoothing said layer and before applying said electromagnetic radiation thereto.

* * * * *